(12) United States Patent
Fujiwara et al.

(10) Patent No.: US 9,683,470 B2
(45) Date of Patent: Jun. 20, 2017

(54) EXHAUST GAS CONTROL APPARATUS FOR INTERNAL COMBUSTION ENGINE

(75) Inventors: Takahiko Fujiwara, Shizuoka-ken (JP); Norihisa Nakagawa, Numazu (JP); Kouichi Kimura, Numazu (JP); Shuntaro Okazaki, Shizuoka-ken (JP); Keisuke Nagasaka, Susono (JP); Ichiro Kitamura, Susono (JP); Satoshi Kamitani, Susono (JP); Koji Morita, Mishima (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 191 days.

(21) Appl. No.: 14/368,832

(22) PCT Filed: Dec. 27, 2011

(86) PCT No.: PCT/JP2011/080324
§ 371 (c)(1),
(2), (4) Date: Dec. 10, 2014

(87) PCT Pub. No.: WO2013/098973
PCT Pub. Date: Jul. 4, 2013

(65) Prior Publication Data
US 2015/0128572 A1    May 14, 2015

(51) Int. Cl.
*F01N 3/20* (2006.01)
*F01N 3/22* (2006.01)
(Continued)

(52) U.S. Cl.
CPC .............. *F01N 3/2006* (2013.01); *F01N 3/20* (2013.01); *F01N 3/22* (2013.01); *F01N 9/00* (2013.01);
(Continued)

(58) Field of Classification Search
CPC ............. F01N 2610/02; F01N 2610/03; F01N 3/2066; F01N 3/0842; F01N 13/02
(Continued)

(56) References Cited

U.S. PATENT DOCUMENTS 4,199,938 A * 4/1980 Nakase .................. F01N 3/222
60/274
5,285,639 A    2/1994 Araki et al.
(Continued)

FOREIGN PATENT DOCUMENTS

DE    198 16 276    10/1999
EP         1445442 A1 *  8/2004 ............... F01N 3/22
(Continued)

OTHER PUBLICATIONS

Translation of JP 01227814, Translated Mar. 2016.*

*Primary Examiner* — Patrick Maines
(74) *Attorney, Agent, or Firm* — Finnegan, Henderson, Farabow, Garrett & Dunner, LLP

(57) ABSTRACT

An exhaust gas control apparatus for an internal combustion engine, controls an exhaust operation of the internal combustion engine (200) provided with an exhaust gas purification catalyst (216) in an exhaust passage (215). The exhaust gas control apparatus for the internal combustion engine is provided with: a warming-up device configured to warm up the exhaust gas purification catalyst; and an oxygen supplying device (220, 221) configured to supply oxygen to the exhaust gas purification catalyst after the end of the warm-up. This makes it possible to preferably desorb sulfur adsorbed to the exhaust gas purification catalyst during warm-up. It is therefore possible to suppress a reduction in purification ability of the exhaust gas purification catalyst due to sulfur coating.

3 Claims, 9 Drawing Sheets

(51) Int. Cl.
*F01N 9/00* (2006.01)
*F01N 11/00* (2006.01)
*F02D 41/02* (2006.01)
*F01N 3/10* (2006.01)

(52) U.S. Cl.
CPC .......... *F01N 11/00* (2013.01); *F02D 41/0255* (2013.01); *F01N 3/101* (2013.01); *F01N 2240/02* (2013.01); *F01N 2260/04* (2013.01); *F01N 2430/08* (2013.01); *F01N 2560/025* (2013.01); *F01N 2560/14* (2013.01); *F01N 2590/11* (2013.01); *F01N 2900/10* (2013.01); *Y02T 10/22* (2013.01); *Y02T 10/47* (2013.01)

(58) Field of Classification Search
USPC ......... 60/274, 273, 285, 286, 295, 301, 304, 60/307
See application file for complete search history.

(56) References Cited

U.S. PATENT DOCUMENTS

| | | | |
|---|---|---|---|
| 5,613,360 A | 3/1997 | Iwai et al. | |
| 5,832,722 A * | 11/1998 | Cullen | B01D 53/8696 60/274 |
| 6,119,450 A * | 9/2000 | Boegner | F01N 3/0842 60/274 |
| 6,161,377 A * | 12/2000 | Boegner | B01D 53/9495 60/274 |
| 6,293,094 B1 * | 9/2001 | Schmidt | F01N 3/0814 60/284 |
| 6,634,169 B1 * | 10/2003 | Andersen | B01D 53/9454 60/274 |
| 6,722,125 B1 * | 4/2004 | Pfalzgraf | F01N 3/0814 60/274 |
| 2004/0255876 A1 * | 12/2004 | Hirooka | F01N 3/22 123/41.05 |
| 2005/0112046 A1 * | 5/2005 | Nagaoka | B01D 53/9495 423/239.1 |
| 2005/0262827 A1 | 12/2005 | Ichimoto et al. | |
| 2009/0077952 A1 | 3/2009 | Komuro | |

FOREIGN PATENT DOCUMENTS

| | | | |
|---|---|---|---|
| JP | 61247842 A * | 11/1986 | |
| JP | 01227814 A * | 9/1989 | |
| JP | 7-229419 | 8/1995 | |
| JP | 2000-204935 | 7/2000 | |
| JP | 2000204935 A * | 7/2000 | |
| JP | 2001214733 A * | 8/2001 | |
| JP | 2002-188481 | 7/2002 | |
| JP | 2005-233115 | 9/2005 | |
| JP | 2005-291206 | 10/2005 | |
| JP | 2005-337171 | 12/2005 | |
| JP | 2006-266115 | 10/2006 | |
| JP | 2007-303361 | 11/2007 | |
| JP | 2007303361 A * | 11/2007 | |
| JP | 2009-79534 | 4/2009 | |
| JP | 2011069281 A * | 4/2011 | |
| WO | WO 9846866 A1 * | 10/1998 | F01N 3/20 |

\* cited by examiner

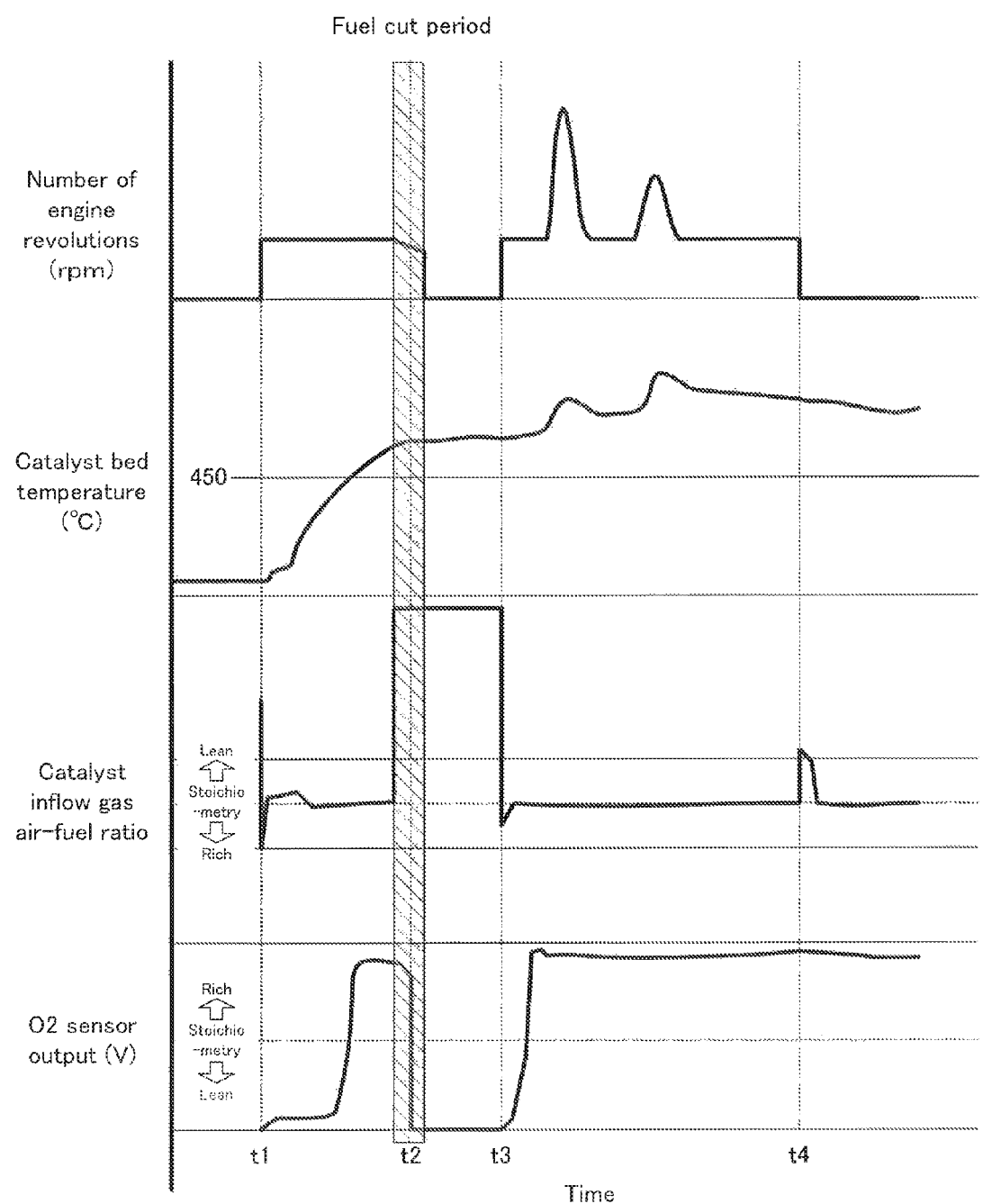

EXHAUST GAS CONTROL APPARATUS FOR INTERNAL COMBUSTION ENGINE

CROSS REFERENCE TO RELATED APPLICATIONS

This application is a national phase application of International Application No. PCT/JP2011/080324, filed Dec. 27, 2011, the content of which is incorporated herein by reference.

TECHNICAL FIELD

The present invention relates to an exhaust gas control apparatus for an internal combustion engine configured to control an exhaust operation of the internal combustion engine installed in a vehicle such as, for example, an automobile.

BACKGROUND ART

In an exhaust passage of this type of internal combustion engine, there is placed a three-way catalyst which can simultaneously purify three components of HC, CO and NO in an exhaust gas. It is generally considered that the three-way catalyst cannot demonstrate an appropriate purification ability, below activation temperature. Thus, at the start of cooling the engine or the like, a so-called catalyst warm-up operation is performed in which the temperature of the exhaust gas passing through the catalyst is increased so that catalyst temperature reaches the activation temperature at an early stage. During the catalyst warm-up operation, the temperature of the catalyst is monitored, and the warm-up operation is stopped at a time point at which the temperature of the catalyst reaches the activation temperature (e.g. refer to Patent document 1).

It is also known that the three-way catalyst deteriorates due to long hours of purification. Thus, in a hybrid vehicle, there is proposed a technology in which a reducing agent is supplied to the three-way catalyst by forcibly rotating the internal combustion engine with a motor (e.g. refer to Patent document 2).

On the other hand, for example, in order to improve fuel efficiency, a fuel cut technology is used in which the supply of fuel to the internal combustion engine is temporarily stopped (e.g. refer to Patent document 3). If the fuel cut is performed, a reduction in purification ability can be supposedly suppressed by making an air-fuel ratio rich when a fuel stop period exceeds a predetermined period (e.g. refer to Patent document 4). Moreover, if the temperature of the catalyst is high, the deterioration of the catalyst can be supposedly suppressed by temporarily not performing the fuel cut (e.g. refer to Patent document 5).

PRIOR ART DOCUMENTS

Patent Documents

Patent document 1: Japanese Patent Application Laid Open No. H07-229419
Patent document 2: Japanese Patent Application Laid Open No. 2006-266115
Patent document 3: Japanese Patent Application Laid Open No. 2005-291206
Patent document 4: Japanese Patent Application Laid Open No. 2005-233115
Patent document 5: Japanese Patent Application Laid Open No. 2005-337171

SUMMARY OF INVENTION

Subject to be Solved by the Invention

Some fuel used for the internal combustion engine contains sulfur as a component. The sulfur in the fuel is adsorbed to a catalyst coated material of the three-way catalyst, for example, as SOx; however, if the catalyst warm-up operation is performed in this state, the sulfur desorbed from the catalyst coated material is adsorbed to noble metal on the catalyst, and catalytic activity thus likely decreases. In particular the sulfur adsorbed to the noble metal is not desorbed even at a relatively high temperature and thus keeps reducing the catalytic activity even after the warm-up. As described above, the technology of performing the warm-up operation on the catalyst has such a technical problem that the absorption of the sulfur reduces the purification ability after the warm-up if the sulfur is contained in the fuel.

In view of the aforementioned problems, it is therefore an object of the present invention to provide an exhaust gas control apparatus for an internal combustion engine configured to preferably desorb the sulfur adsorbed to the catalyst.

Means for Solving the Subject

The above object of the present invention can be achieved by an exhaust gas control apparatus for an internal combustion engine comprising an exhaust gas purification catalyst in an exhaust passage, said exhaust gas control apparatus comprising: a warming-up device configured to perform warm-up on the exhaust gas purification catalyst; and an oxygen supplying device configured to supply oxygen to the exhaust gas purification catalyst after end of the warm-up.

The exhaust gas control apparatus for the internal combustion engine of the present invention controls an exhaust operation of the internal combustion engine provided with the exhaust gas purifying catalyst in the exhaust passage. The internal combustion engine of the present invention is configured, for example, as a power element which can supply power to a drive shaft of a vehicle, and can adopt various aspects regardless of, for example, a fuel type, a fuel supply aspect, a fuel combustion aspect, a configuration of an intake/exhaust system, cylinder arrangement and the like. Moreover, the exhaust gas purifying catalyst of the present invention is a catalyst which can purify at least sulfur (S) contained in the exhaust gas. The exhaust gas purifying catalyst is provided with noble metal such as, for example, platinum (Pt), rhodium (Rd), Palladium (Pd), on a carrier.

In operation of the exhaust gas control apparatus for the internal combustion engine of the present invention, firstly, the warm-up of the exhaust gas purification catalyst is performed by the warming-up device. The warming-up device increases the temperature of the exhaust gas passing through the exhaust gas purification catalyst, for example, by a method of retarding or delaying ignition timing of the internal combustion engine or the like, causing the temperature of the exhaust gas purification catalyst to quickly reach the activation temperature. This makes it possible to effectively purify the exhaust gas even at the start of cooling the internal combustion engine or the like. In some cases, the warm-up of the exhaust gas purification catalyst is accompanied by, for example, the deterioration of operability and fuel efficiency or the like due to a reduction in output of the internal combustion engine. Therefore, the warm-up is ended as soon as the temperature of the exhaust gas purification catalyst reaches the activation temperature.

Here, the sulfur contained as a component of fuel is released to the exhaust passage as SOx (sulfur oxide) after the combustion of the fuel and is adsorbed to the exhaust gas purification catalyst. The sulfur adsorbed to the exhaust gas purification catalyst is desorbed, for example, at about 450 degrees C. Thus, the sulfur adsorbed before the warm-up of the exhaust gas purification catalyst described above is desorbed by the warm-up.

According to the study of the present inventors, however, the sulfur desorbed by the warm-up is adsorbed to the noble metal of the exhaust gas purification catalyst under a rich atmosphere. The sulfur adsorbed to the noble metal of the exhaust gas purification catalyst as described above is not desorbed until the temperature reaches an extremely high temperature (e.g. 700 degrees C. or more) under the rich atmosphere. Thus, if no measures are taken, the sulfur remains adsorbed to the exhaust gas purification catalyst even after the end of the warm-up, and causes the reduction in the purification ability of the exhaust gas purification catalyst.

Particularly in the present invention, oxygen is supplied to the exhaust gas purification catalyst by the oxygen supplying device after the end of the warm-up of the exhaust gas purification catalyst. As described above, if oxygen is supplied to the exhaust gas purification catalyst after the end of the warm-up, the sulfur adsorbed to the noble metal can be oxidized and desorbed as SO2 even though it is not at the high temperature of 700 degrees C. or more as described above. It is thus possible to prevent the decrease in the purification ability of the exhaust gas purification catalyst after the end of the warm-up due to the adsorbed sulfur.

Incidentally, even if the oxygen supplied to the exhaust gas purification catalyst is not extremely concentrated (e.g. similar to the atmosphere), the aforementioned effect can be appropriately achieved.

As explained above, according to the exhaust gas control apparatus for the internal combustion engine of the present invention, it is possible to preferably desorb the sulfur adsorbed to the exhaust gas purification catalyst.

In one aspect of the exhaust gas control apparatus for the internal combustion engine of the present invention, wherein said oxygen supplying device includes at least one of a fuel supply stopping device configured to temporarily stop a supply of fuel to the internal combustion engine, a motoring device configured to rotate the internal combustion engine by power from an electric motor, and a secondary air supplying device configured to supply an air in a different passage from that of an air-fuel mixture which is supplied to the internal combustion engine.

According to this aspect, if the oxygen supplying device includes the fuel supply stopping device, the supply of the fuel to the internal combustion engine is temporarily stopped (or so-called fuel cut is performed), by which the air not containing the fuel (i.e. having a high oxygen concentration) is supplied to the exhaust gas purification catalyst.

If the oxygen supplying device includes the motoring device, the stopped internal combustion engine is rotated by the power from the electric motor (or so-called motoring is performed), by which the air not containing the fuel is supplied to the exhaust gas purification catalyst.

If the oxygen supplying device includes the secondary air supplying device, the air is supplied to the exhaust gas purification catalyst in the different passage from that of the air-fuel mixture which is supplied to the internal combustion engine, from the secondary air supplying device which is configured, for example, as an air pump.

As described above, according to this aspect, it is possible to certainly supply oxygen to the exhaust gas purification catalyst after the warm-up.

In another aspect of the exhaust gas control apparatus for the internal combustion engine of the present invention, comprising a catalyst bed temperature detecting device configured to detect bed temperature of the exhaust gas purification catalyst, wherein said oxygen supplying device supplies oxygen to the exhaust gas purification catalyst if the bed temperature of the exhaust gas purification catalyst is in a predetermined region in which the bed temperature is greater than or equal to a temperature at which adsorbed SOx is desorbed.

According to this aspect, before oxygen is supplied to the exhaust gas purification device catalyst by the oxygen supplying device, the bed temperature of the exhaust gas purification catalyst is detected by the catalyst bed temperature detecting device. Then, oxygen is supplied to the exhaust gas purification catalyst by the oxygen supplying device if the detected temperature is in the predetermined region in which the detected temperature is greater than or equal to the temperature at which SOx adsorbed to the exhaust gas purification catalyst is desorbed. The "predetermined region" herein is a value for determining whether or not oxygen is supplied to the exhaust gas purification catalyst, and is set as a temperature region in which SOx can be effectively desorbed and in which the deterioration of the exhaust gas purification catalyst can be reduced.

Due to the supply of oxygen as described above, the sulfur adsorbed to the exhaust gas purification catalyst is desorbed even though it is not at the high temperature of, for example, 700 degrees C. or more. If, however, the bed temperature of the exhaust gas purification catalyst is extremely low (e.g. 400 degrees C. or less), effective desorption is hard even if oxygen is supplied. In contrast, if the bed temperature of the exhaust gas purification catalyst is extremely high (e.g. 800 degrees C. or more), the deterioration of the exhaust gas purification catalyst is likely accelerated by the supply of oxygen.

In this aspect, however, oxygen is supplied if the bed temperature of the exhaust gas purification catalyst is in the predetermined region, and the aforementioned disadvantages can be thus avoided. It is therefore possible to desorb the sulfur adsorbed to the exhaust gas purification catalyst, more preferably.

In another aspect of the exhaust gas control apparatus for the internal combustion engine of the present invention, wherein said oxygen supplying device supplies oxygen to the exhaust gas purification catalyst during intermittent stop of the internal combustion engine.

According to this aspect, when oxygen is supplied to the exhaust gas purification catalyst by the oxygen supplying device, the internal combustion engine is intermittently stopped (i.e. the operation of the engine is temporarily stopped in a hybrid vehicle or the like). Thus, the exhaust gas caused by the combustion of the fuel in the internal combustion engine is not generated, and a relatively high concentration of oxygen can be easily supplied to the exhaust gas purification catalyst.

In another aspect of the exhaust gas control apparatus for the internal combustion engine of the present invention, comprising an air-fuel ratio detecting device configured to detect an air-fuel ratio within the exhaust gas purification catalyst, wherein said oxygen supplying device supplies oxygen to the exhaust gas purification catalyst if the air-fuel ratio within the exhaust gas purification catalyst is in a rich atmosphere.

According to this aspect, before oxygen is supplied to the exhaust gas purification catalyst by the oxygen supplying device, the air-fuel ratio within the exhaust gas purification catalyst is detected by the air-fuel ratio detecting device. If the detected air-fuel ratio is in the rich atmosphere, oxygen is supplied to the exhaust gas purification catalyst by the oxygen supplying device. The "rich atmosphere" herein means a state in which a fuel ratio is higher than an ideal air-fuel ratio (i.e. a stoichiometric state).

If the air-fuel ratio within the exhaust gas purification catalyst before the oxygen supply is not in the rich atmosphere (i.e. is in a lean atmosphere), that likely reduces a sulfur desorption effect due to the supply of oxygen. According to this aspect, such a situation can be prevented, and it is thus possible to effectively desorb the sulfur adsorbed to the exhaust gas purification catalyst.

In another aspect of the exhaust gas control apparatus for the internal combustion engine of the present invention, comprising a rich atmosphere setting device configured to set the air-fuel ratio within the exhaust gas purification catalyst to be in the rich atmosphere before oxygen is supplied to the exhaust gas purification catalyst by said oxygen supplying device.

According to this aspect, if the air-fuel ratio within the exhaust gas purification catalyst before the oxygen supply is not in the rich atmosphere, the air-fuel ratio within the exhaust gas purification catalyst is forcibly set to be in the rich atmosphere. It is thus possible to effectively desorb the sulfur adsorbed to the exhaust gas purification catalyst.

In another aspect of the exhaust gas control apparatus for the internal combustion engine of the present invention, comprising: an air-fuel ratio detecting device configured to detect an air-fuel ratio within the exhaust gas purification catalyst; and an oxygen concentration detecting device configured to detect an oxygen concentration within the exhaust gas purification catalyst, wherein said oxygen supplying device stops the supply of oxygen to the exhaust gas purification catalyst if the air-fuel ratio within the exhaust gas purification catalyst is in a lean atmosphere and if the oxygen concentration within the exhaust gas purification catalyst is greater than or equal to a predetermined value.

According to this aspect, when oxygen is supplied to the exhaust gas purification catalyst by the oxygen supplying device, the air-fuel ratio within the exhaust gas purification catalyst is detected by the air-fuel ratio detecting device. Moreover, the oxygen concentration within the exhaust gas purification catalyst is detected by the oxygen concentration detecting device. Then, if the detected air-fuel ratio is in the lean atmosphere and if the oxygen concentration within the exhaust gas purification catalyst is greater than or equal to the predetermined concentration, the supply of oxygen to the exhaust gas purification catalyst is stopped by the oxygen supplying device. The "predetermined concentration" herein is a threshold value for determining whether or not the supply of oxygen by the oxygen supplying device is stopped, and is set as a value of oxygen concentration which allows sufficient desorption of the sulfur adsorbed to the exhaust gas purification catalyst.

According to the configuration described above, it is possible to prevent that the supply of oxygen is continued even though the sulfur adsorbed to the exhaust gas purification catalyst is sufficiently desorbed. It is therefore possible to desorb the sulfur adsorbed to the exhaust gas purification catalyst, more preferably.

In another aspect of the exhaust gas control apparatus for the internal combustion engine of the present invention, comprising: a second exhaust gas purification catalyst disposed in the exhaust passage after the exhaust gas purification catalyst; and an inflow air amount detecting device configured to detect an inflow air amount to the second exhaust as purification catalyst during the supply of oxygen by said oxygen supplying device, wherein said oxygen supplying device stops the supply of oxygen to the exhaust gas purification catalyst if the inflow air amount reaches a predetermined amount.

According to this aspect, on the downstream side of the exhaust gas purification catalyst in the exhaust passage (i.e. on the opposite side to the internal combustion engine as viewed from the exhaust gas purification catalyst), there is disposed the second exhaust gas purification catalyst. The second exhaust gas purification catalyst is configured, for example, as an underfloor catalyst, and purifies a substance that cannot be purified or can be only partially purified by the exhaust gas purification catalyst.

In this aspect, if the supply of oxygen to the exhaust gas purification catalyst is started by the oxygen supplying device, the inflow air amount to the second exhaust gas purification catalyst is detected by the inflow air amount detecting device. Then, if the detected inflow air amount is greater than or equal to the predetermined amount, the supply of oxygen to the exhaust gas purification catalyst is stopped by the oxygen supplying device. The "predetermined amount" herein means a threshold value for determining whether or not the supply of oxygen by the oxygen supplying device is stopped, and is set to correspond to the inflow air amount which allows sufficient desorption of the sulfur adsorbed to the exhaust gas purification catalyst.

According to the configuration described above, it is possible to prevent that the supply of oxygen is continued even though the sulfur adsorbed to the exhaust gas purification catalyst is sufficiently desorbed. It is therefore possible to desorb the sulfur adsorbed to the exhaust gas purification catalyst, more preferably.

In another aspect of the exhaust gas control apparatus for the internal combustion engine of the present invention, comprising a second rich atmosphere setting device configured to set an air-fuel ratio within the exhaust gas purification catalyst to be in a rich atmosphere after the supply of oxygen to the exhaust gas purification catalyst by said oxygen supplying device is ended.

According to this aspect, if the supply of oxygen to the exhaust gas purification catalyst by the oxygen supplying device is ended, the air-fuel ratio within the exhaust gas purification catalyst is set to be in the rich atmosphere by the second rich atmosphere setting device. In this manner, it is possible to prevent that the amount of emission of NOx (nitrogen oxide) increases in the operation of the internal combustion engine after the end of the supply of oxygen.

In an aspect in which the aforementioned second rich atmosphere setting device is provided, wherein said second rich atmosphere setting device sets the air-fuel ratio within the exhaust gas purification catalyst to be in the rich atmosphere by increasing a fuel injection amount when the internal combustion engine is restarted after intermittent stop.

In this case, after the supply of oxygen to the exhaust gas purification catalyst by the oxygen supplying device, the fuel injection amount is increased from a normal amount when the internal combustion engine is restarted after the intermittent stop. In other words, upon restart of the internal combustion engine after the supply of oxygen, more fuel is injected in comparison with the fuel upon restart in the normal case (i.e. in a case where oxygen is not supplied by the oxygen supplying device). In this manner, the air-fuel ratio within the exhaust gas purification catalyst can be certainly set to be in the rich atmosphere. It is therefore possible to prevent that the amount of emission of NOx increases in the operation of the internal combustion engine after the end of the supply of oxygen.

In an aspect in which the fuel injection amount is increased upon restart of the internal combustion engine, comprising an oxygen amount detecting device configured to detect an oxygen amount supplied to the exhaust gas purification catalyst by said oxygen supplying device, wherein said second rich atmosphere setting device corrects an increment of the fuel injection amount on the basis of the detected oxygen amount.

In this case, the oxygen amount supplied to the exhaust gas purification catalyst by the oxygen supplying device is detected by the oxygen amount detecting device. Then, the increment of the fuel injected when the internal combustion engine is restarted after the intermittent stop is corrected on the basis of the detected oxygen amount. In this manner, the amount of the fuel injected upon restart of the internal combustion engine can be corrected to an appropriate value (i.e. a value which allows the air-fuel ratio within the exhaust gas purification catalyst to be certainly in the rich atmosphere). It is therefore possible to preferably prevent that the amount of emission of NOx increases in the operation of the internal combustion engine of the end of the supply of oxygen.

In another aspect of the exhaust gas control apparatus for the internal combustion engine of the present invention, wherein the exhaust gas purification catalyst is a three-way catalyst.

According to this aspect, the exhaust gas purification catalyst is configured as the three-way catalyst which can purify HC (hydrocarbon), CO (carbon monoxide) and NOx in the exhaust gas. In the three-way catalyst, as described above, there can be a situation in which the sulfur remains adsorbed to the noble metal even after the warm-up. It is thus possible to certainly desorb the sulfur by supplying oxygen after the warm-up and prevent the decrease in the purification ability.

In another aspect of the exhaust gas control apparatus for the internal combustion engine of the present invention, comprising: a number-of-revolutions detecting device configured to detect number of revolutions of the internal combustion engine; and a load detecting device configured to detect a load of the internal combustion engine, wherein said oxygen supplying device starts the supply of oxygen to the exhaust gas purification catalyst on the basis of the number of revolutions of the internal combustion engine and the load of the internal combustion engine.

According to this aspect, before oxygen is supplied to the exhaust gas purification catalyst by the oxygen supplying device, the number of revolutions of the internal combustion engine is detected by the number-of-revolutions detecting device. Moreover, the load of internal combustion engine is detected by the load detecting device. Then, on the oxygen supplying device, it is determined whether or not the supply of oxygen to the exhaust gas purification catalyst is started on the basis of the detected number of revolutions and the detected load of the internal combustion engine.

Specifically, the oxygen supplying device starts the supply of oxygen to the exhaust gas purification catalyst if both the number of revolutions and the load of the internal combustion engine have low values, to the extent that the supply of oxygen to the exhaust gas purification catalyst does not hinder the operation of the internal combustion engine. In this manner, it is possible to desorb the sulfur adsorbed to the exhaust gas purification catalyst while preventing the occurrence of a defect and the deterioration of derivability in the vehicle provided with the internal combustion engine.

The operation and other advantages of the present invention will become more apparent from the embodiment explained below.

BRIEF DESCRIPTION OF DRAWINGS

FIG. 9 is a chart illustrating changes in various parameters in operation of the exhaust gas control apparatus for the internal combustion engine in the embodiment.

MODE FOR CARRYING OUT THE INVENTION

Hereinafter, an embodiment of the present invention will be explained with reference to the drawings.

<Apparatus Configuration>

Figure 1:
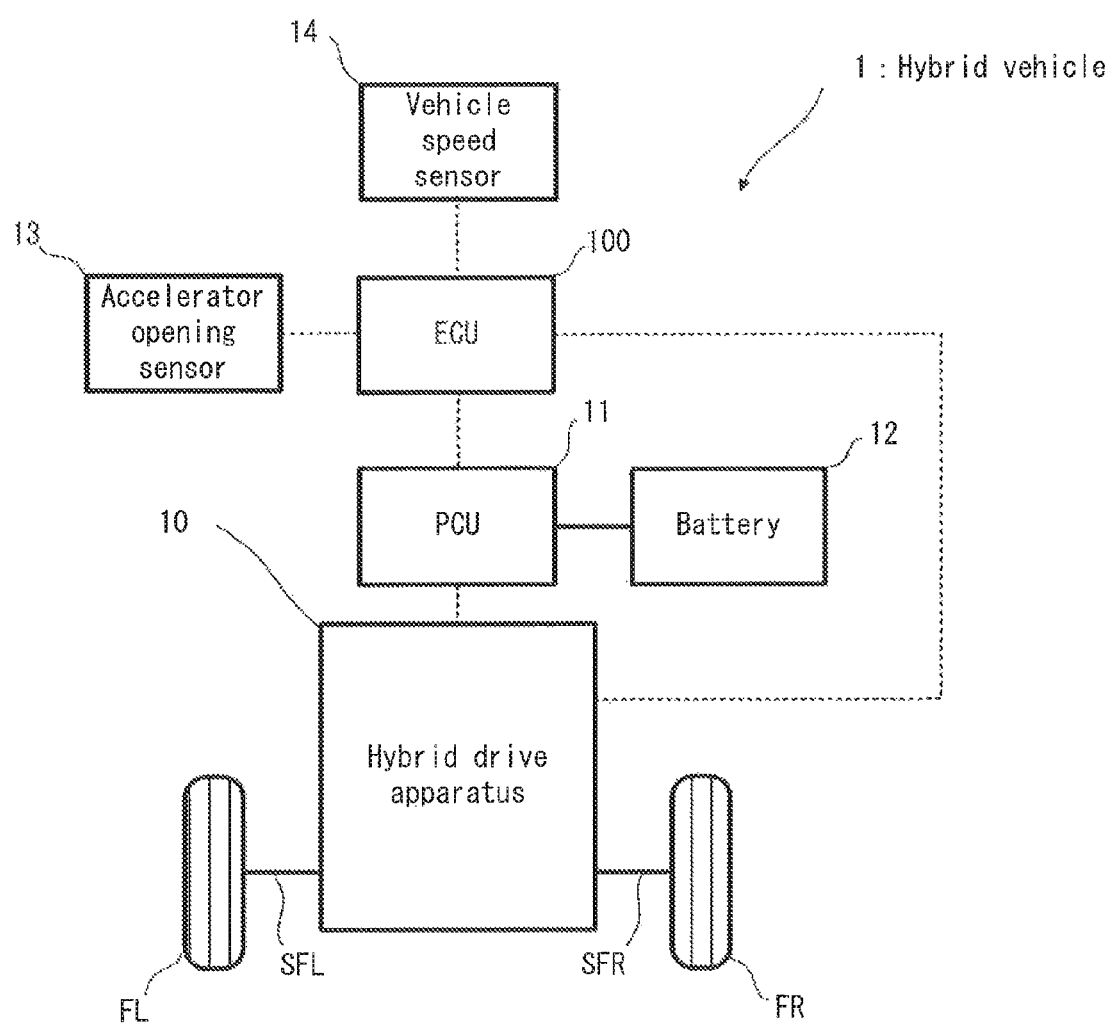
FIG. 1 is a schematic configuration diagram conceptually illustrating a configuration of a hybrid vehicle.

Firstly, an entire configuration of a hybrid vehicle in which an exhaust gas control apparatus for an internal combustion engine in the embodiment is installed will be explained with reference to FIG. 1. FIG. 1 is a schematic configuration diagram conceptually illustrating the configuration of the hybrid vehicle.

In FIG. 1, a hybrid vehicle 1 in the embodiment is provided with a hybrid drive apparatus 10, a power control unit (PCU) 11, a battery 12, an accelerator opening sensor 13, a vehicle speed sensor 14, and an electronic control unit (ECU) 100.

The ECU 100 is provided with a central processing unit (CPU), a read only memory (ROM), a random access memory (RAM), and the like. The ECU 100 is an electronic control unit configured to control the operation of each unit of the hybrid vehicle 1. The ECU 100 is configured to perform various controls of the hybrid vehicle 1 in accordance with a control program stored in, for example, the ROM or the like. The ECU 100 constitutes one portion of the "exhaust gas control apparatus for the internal combustion engine" of the present invention.

The PCU 11 converts direct-current (DC) power extracted from the battery 12 into alternating-current (AC) power and supplies it to motor generators MG1 and MG2 described later. The PCU 11 includes a not-illustrated inverter capable of converting AC power generated by the motor generators MG1 and MG2 into DC power and supplying it to the battery 12. In other words, the ICU 11 is a power control unit configured to control input output of electric power between the battery 12 and each motor generator, or input output of electric power between the motor generators (i.e. in this case, the electric power is transferred between the motor generators without via the battery 12). The PCU 11 is electrically connected to the ECU 100, and the operation thereof is controlled by the ECU 100.

The battery 12 is a chargeable storage battery which functions as an electric power supply source associated with the electric power for power running of the motor generators MG1 and MG2. The amount of stored power of the battery 12 can be detected by the ECU 100 or the like.

The accelerator opening sensor 13 is a sensor configured to detect an accelerator opening degree Ta which is a manipulated variable or an operation amount of a not-illustrated accelerator pedal of the hybrid vehicle 1. The accelerator opening sensor 13 is electrically connected to the ECU 100, and the detected accelerator opening degree Ta is referred to by the ECU 100 with a regular or irregular period.

The vehicle speed sensor 14 is a sensor configured to detect a vehicle speed V of the hybrid vehicle 1. The vehicle speed sensor 14 is electrically connected to the ECU 100, and the detected vehicle speed V is referred to by the ECU 100 with a regular or irregular period.

Figure 2:
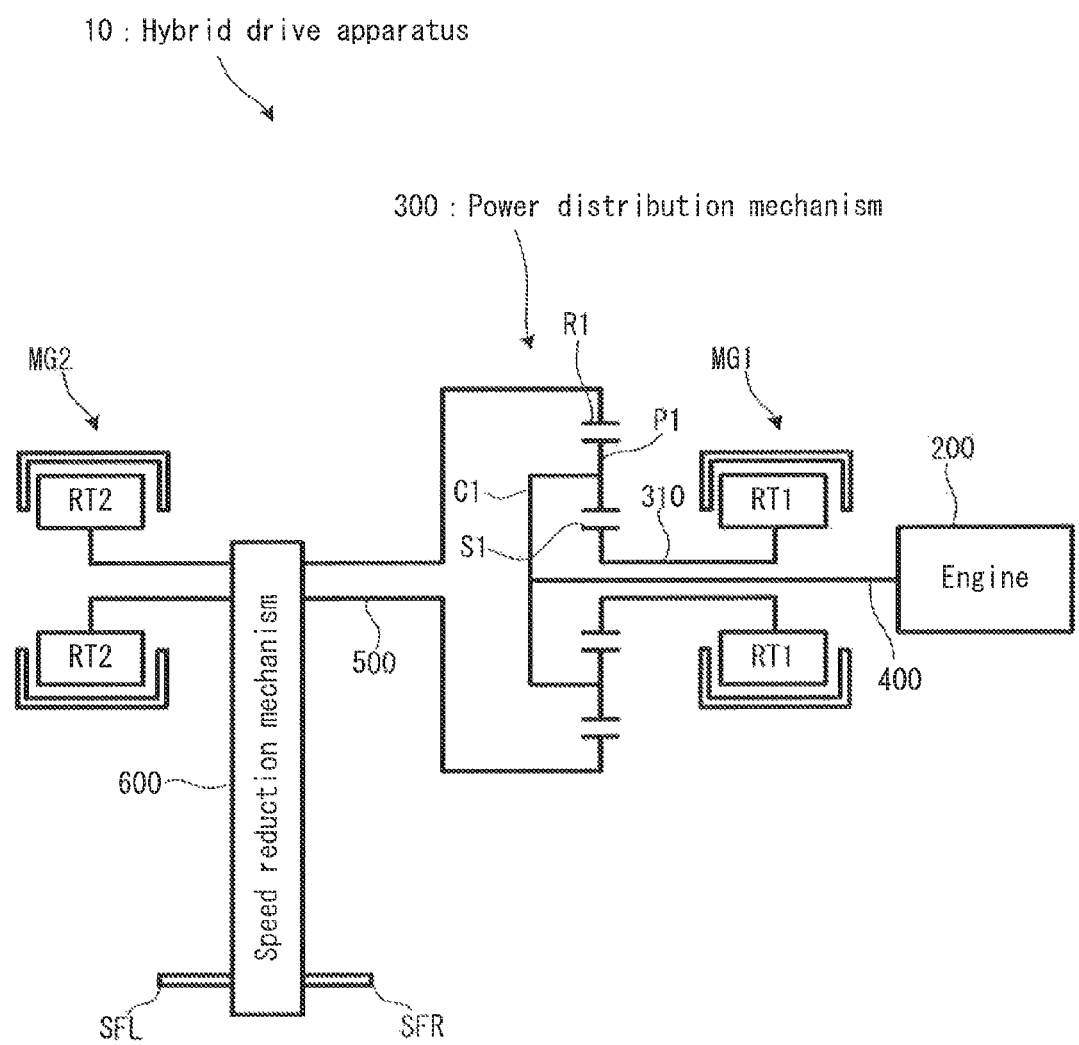
FIG. 2 is a schematic configuration diagram conceptually illustrating a configuration of a hybrid drive apparatus.

The hybrid drive apparatus 10 is a power unit which functions as a power train of the hybrid vehicle 1. Now, with reference to FIG. 2, a detailed configuration of the hybrid drive apparatus 10 will be explained. FIG. 2 is a schematic configuration diagram conceptually illustrating the configuration of the hybrid drive apparatus.

In FIG. 2, the hybrid drive apparatus 10 is provided mainly with an engine 200, a power distribution mechanism 300, the motor generator MG1 (hereinafter abbreviated to "MG1" as occasion demands), the motor generator MG2 (hereinafter abbreviated to "MG2" as occasion demands), an input shaft 400, a drive shaft 500, and a speed reduction mechanism 600.

Figure 3:
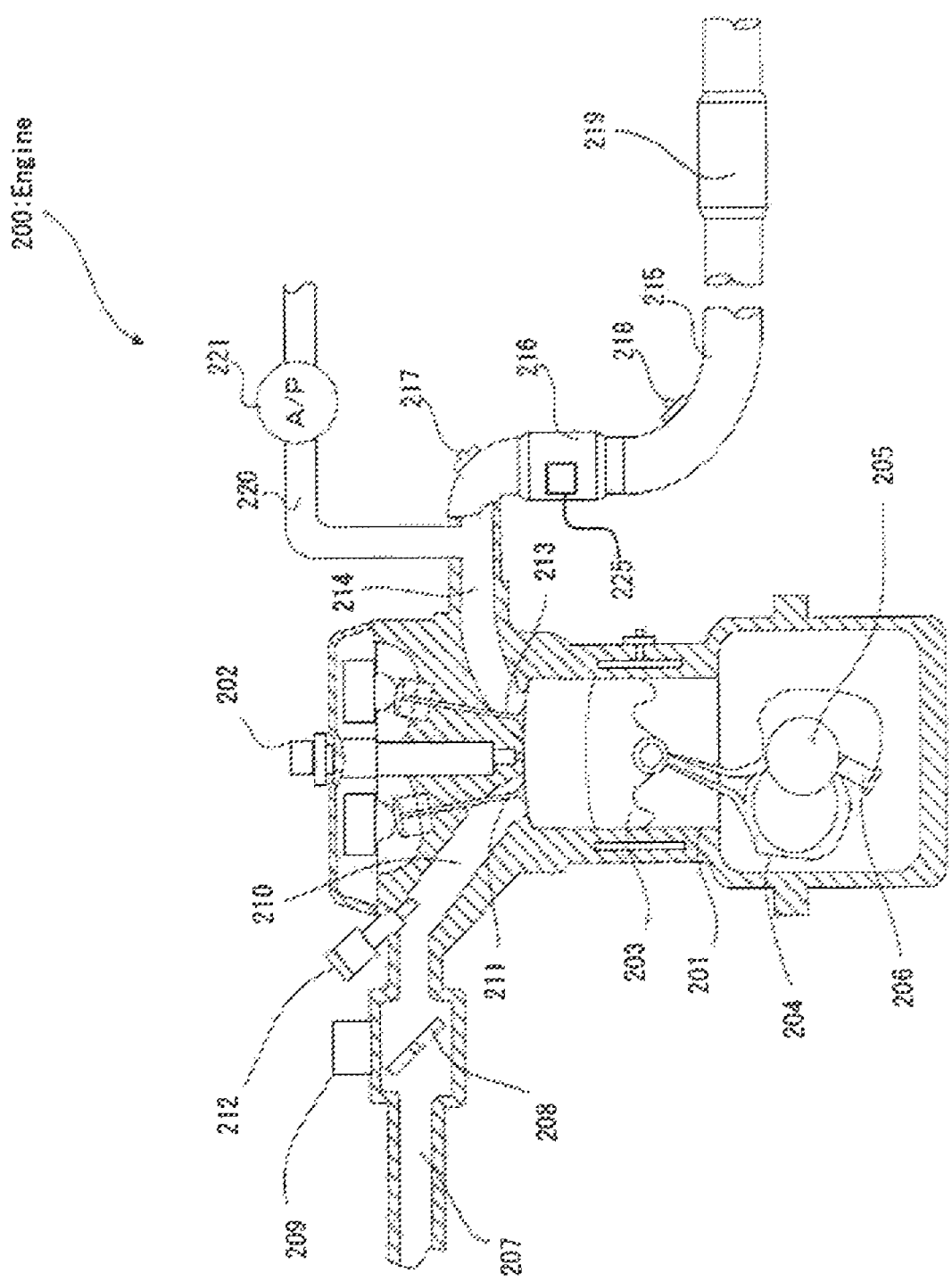
FIG. 3 is a schematic configuration diagram conceptually illustrating a configuration of an engine.

The engine 200 is a gasoline engine as one example of the "internal combustion engine" of the present invention. The engine 200 is configured to function as a main power source of the hybrid vehicle 10. Now, with reference to FIG. 3, a detailed configuration of the engine 200 will be explained. FIG. 3 is a schematic diagram illustrating a cross sectional configuration of the engine.

Incidentally, the "internal combustion engine" of the present invention conceptually includes an engine which has at least one cylinder and which is configured to extract a force generated when an air-fuel mixture containing various fuels such as, for example, gasoline, light oil or alcohol is burned in a combustion chamber within the cylinder(s), as a driving force through a physical or mechanical transmitting device such as, for example, a piston, a connecting rod, and a crankshaft, as occasion demands. As long as the concept is satisfied, the configuration of the internal combustion engine of the present invention is not limited to that of the engine 200 but may have various aspects. Moreover, the engine 200 is an engine in which a plurality of cylinders 201 are aligned in a direction perpendicular to the paper; however, only one cylinder 201 will be explained in FIG. 3 because the individual cylinders 201 have the same configuration.

In FIG. 3, the engine 200 is configured to enable the air-fuel mixture to be burned via an ignition operation of an ignition apparatus 202 in which a spark plug (whose reference numeral is omitted) is partially exposed in a combustion chamber in the cylinder 201. The engine 200 is also configured to convert a reciprocating motion of a piston 203 caused by an explosive force due to the combustion, into as rotational motion of a crankshaft 205 through a connecting rod 204.

In the vicinity of the crankshaft 205, there is disposed a crank position sensor 206 configured to detect a rotational position of the crankshaft 205 (i.e. a crank angle). The crank position sensor 206 is electrically connected to the ECU 100 (not illustrated), and the ECU 100 is configured to calculate the number of engine revolutions NE of the engine 200 on the basis of a crank angle signal outputted from the crank position sensor 206.

In the engine 200, an air sucked from the exterior (or intake air) is supplied through an intake tube 207 and an intake port 210 to the inside of the cylinder 201 upon opening of an intake valve 211. On the other hand, a fuel injection valve of an injector 212 is exposed in the intake port 210, and the fuel injection valve is configured to inject fuel to the intake port 210. The fuel injected from the injector 212 is mixed with the intake air before or after the opening timing of the intake 115 valve 211, thereby making the aforementioned air-fuel mixture.

The fuel is stored in a not-illustrated fuel tank and is supplied to the injector 212 through a not-illustrated delivery pipe by the operation of a not-illustrated feed pump. The air-fuel mixture burned in the cylinder 201 becomes an exhaust gas and is supplied to an exhaust tube 215 through an exhaust port 214 upon opening of an exhaust valve 213 which opens or closes in conjunction with the opening or closing of the intake valve 211.

On the other hand, on the upstream side of the intake port 210 in the intake tube 207, there is disposed a throttle valve 208 configured to adjust an intake air amount associated with the intake air supplied through a not-illustrated cleaner. The throttle valve 208 is configured such that a driving state thereof is controlled by a throttle valve motor 209 which is electrically connected to the ECU 100. Incidentally, the ECU 100 controls the throttle valve motor 209 basically to obtain a throttle opening degree according to the opening degree of an accelerator pedal which is not illustrated (i.e. the aforementioned accelerator opening degree Ta); however, the ECU 100 can also adjust the throttle opening degree without a driver's intention through the operation control of the throttle valve motor 209. In other words, the throttle valve 208 is configured as a kind of electronically-controlled throttle valve.

In the exhaust tube 215, a three-way catalyst 216 as one example of the "exhaust gas purification catalyst" of the present invention is disposed. The three-way catalyst 216 is a catalyst apparatus configured to reduce NOx (nitrogen oxide) in the exhaust gas emitted from the engine 200 and to oxidize CO) (carbon monoxide) and HC (hydrocarbon) in the exhaust gas. The three-way catalyst 216 in the embodiment can adsorb S (sulfur). Incidentally, a form which can be adopted by the catalyst apparatus is not limited to the three-way catalyst as described above. Instead of or in addition to the three-way catalyst, various catalysts such as, for example, a NSR catalyst (or NOx storage-reduction catalyst) or an oxidation catalyst may be disposed.

On the upstream side of the three-way catalyst 216 in the exhaust tube 215, there is disposed an air-fuel ratio sensor 217. The air-fuel ratio sensor 215 is one example of the "air-fuel ratio detecting device" of the present invention, and is configured to detect an air-fuel ratio of the exhaust gas. Moreover, on the downstream side of the three-way catalyst 216 in the exhaust tube 215, there is disposed an O2 sensor 218. The O2 sensor 218 is one example of the "oxygen concentration detecting device" of the present invention, and is configured to detect the oxygen concentration of the exhaust gas. Each of the air-fuel ratio sensor 217 and the O2 sensor 218 is electrically connected to the ECU 100, and each of the detected air-fuel ratio and the detected oxygen concentration is recognized by the ECU 100 with a regular or irregular detection period.

On the downstream side of the O2 sensor in the exhaust tube 215, there is disposed an underfloor catalyst 219. The underfloor catalyst 219 is one example of the "second exhaust gas purification catalyst" of the present invention, and purifies a substance that cannot be purified or can be only partially purified by the three-way catalyst 216.

In the surroundings of the exhaust port 214 in the exhaust tube 215, there connected a secondary air supply tube 220. The secondary air supply tube 220 is provided with an air pump 221, and is configured to supply a secondary air to the exhaust tube 215. The secondary air supply tube 220 and the air pump 221 herein function as one example of the "oxygen supplying device" of the present invention.

Back in FIG. 2, the motor generator MG1 is an electric motor generator having a power running function for converting electrical energy into kinetic energy and a regeneration function for converting kinetic energy into electrical energy. The motor generator MG2, as in the motor generator MG1, is an electric motor generator having the power running function for converting electrical energy into kinetic energy and the regeneration function for converting kinetic energy into electrical energy. Incidentally, the motor generators MG1 and MG2 may be configured, for example, as synchronous motor generators. For example, each of the motor generators MG1 and MG2 is provided with a rotor having a plurality of permanent magnets on an outer circumferential surface and a stator in which a three-phase coil for forming a rotating magnetic field is wound; however, each of the motor generators may have another configuration.

The power distribution mechanism 300 is provided with a sun gear S1 provided in a central portion thereof, a ring gear R1 provided concentrically on an outer circumference of the sun gear S1, a plurality of pinion gears P1 which are disposed between the sun gear S1 and the ring gear R1 and each of which revolves around the outer circumference of the sun gear S1 while rotating on its own axis, and a carrier C1 which supports a rotating shaft of each pinion gear.

Here, the sun gear S1 is coupled with a rotor RT1 of the MG1 through a sun gear shaft 310 and the number of revolutions thereof is equivalent to the number of revolutions Nmg1 of the MG1 (hereinafter referred to as "MG1 number-of-revolutions Nmg1" as occasion demands). The ring gear R1 is coupled with a rotor RT2 of the MG2 through a clutch 710, the drive shaft 500, and the speed reduction mechanism 600, and the number of revolutions thereof has an unambiguous relation with the number of revolutions Nmg2 of the MG2 (hereinafter referred to as "MG2 number-of-revolutions Nmg2" as occasion demands). Moreover, the carrier C1 is coupled with the input shaft 400 coupled with the aforementioned crankshaft 205 of the engine 200, and the number of revolutions thereof is equivalent to the number of engine revolutions NE of the engine 200. In the hybrid drive apparatus 10, each of the MG1 number-of-revolutions Nmg1 and the MG2 number-of-revolutions Nmg2 is detected with a regular period by a rotation sensor such as a resolver, and is transmitted to the ECU 100 with a regular or irregular period.

On the other hand, the drive shaft 500 is coupled with drive shafts SFR and SFL which drive a right front wheel FR and a left front wheel FL as driving wheels of the hybrid vehicle 1, respectively, via the speed reduction mechanism 600 which is a speed reducing apparatus including various reduction gears and differential gears. Therefore, motor torque Tmg2 supplied from the motor generator MG2 to the drive shaft 500 is transmitted to each drive shaft via the speed reduction mechanism 600, and a driving force from each driving wheel transmitted through each drive shaft is inputted to the motor generator MG2 via the speed reduction mechanism 600 and the drive shaft 500 in the same manner. Therefore, the MG2 number-of-revolutions Nmg2 has an unambiguous relation with the vehicle speed V of the hybrid vehicle 1.

The power distribution mechanism 300 is configured to distribute engine torque Te which is supplied from the engine 200 to the input shaft 400 through the crankshaft 205, to the sun gear S1 and the ring gear R1 at a predetermined ratio (a ratio according to a gear ratio between the gears) by the carrier C1 and the pinion gears P1, and is configured to divide the power of the engine 200 into two systems, under the above configuration.

<Explanation of Operation>

Figure 4:
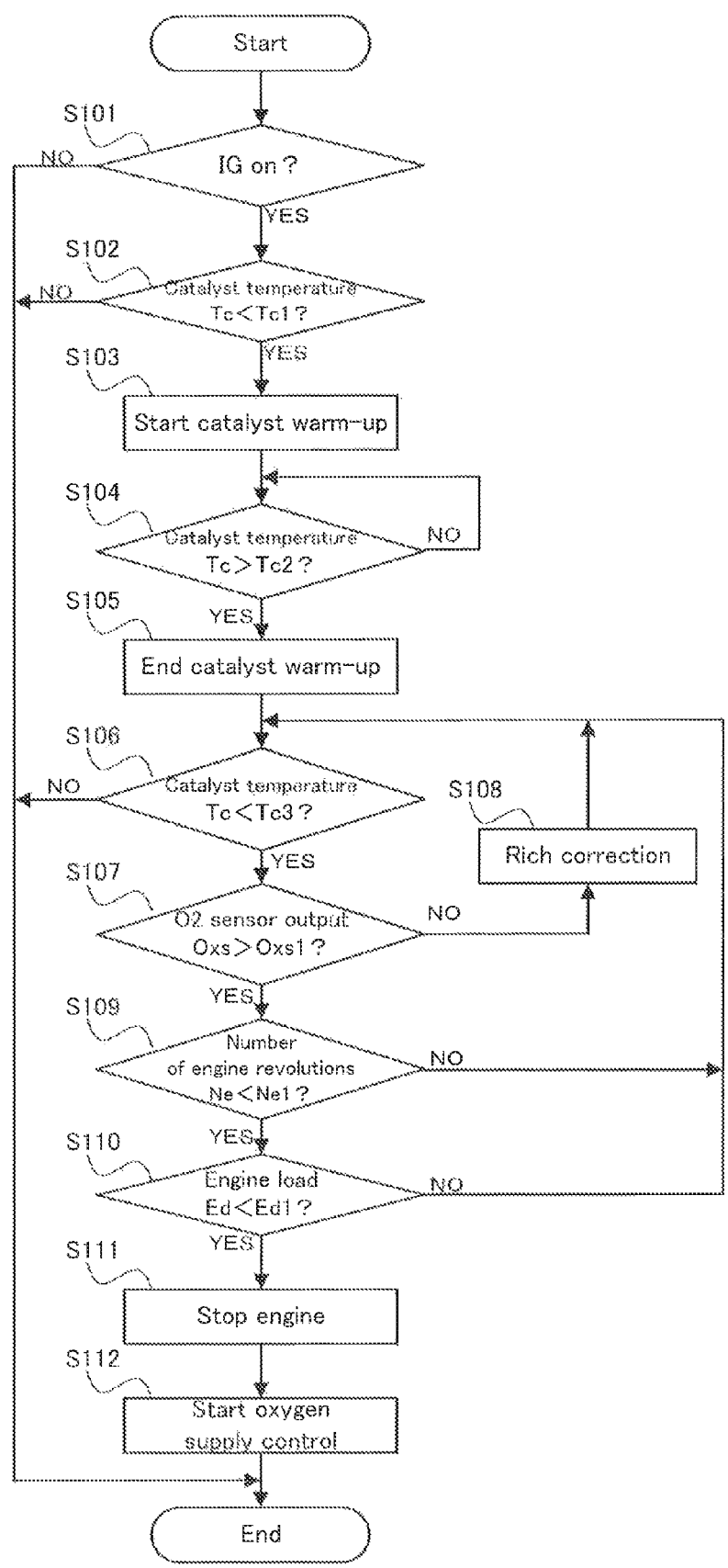
FIG. 4 is a flowchart illustrating the operation of an exhaust gas control apparatus for an internal combustion engine until the start of oxygen supply control.

Next, the operation of the exhaust gas control apparatus for the internal combustion engine in the embodiment and the resulting effect will be explained with reference to FIG. 4 to FIG. 9. Hereinafter, firstly, a process until the start of oxygen supply control which is unique to the embodiment will be explained with reference to FIG. 4. FIG. 4 is a flowchart illustrating the operation of the exhaust gas control apparatus for the internal combustion engine until the start of the oxygen supply control.

In FIG. 4, in operation of the exhaust gas control apparatus for the internal combustion engine in the embodiment, firstly, when ignition is turned on (step S101: YES), the temperature of the three-way catalyst 216 is detected, and it is determined whether or not a detected temperature Tc is less than a threshold value Tc1 (step S102). The threshold value Tc1 is a threshold value for determining the low temperature start of the engine 200, and, for example, there is set a value of the activation temperature (e.g. 400 degrees C.) of the three-way catalyst 216. The temperature of the three-way catalyst 216 is detected, for example, by a temperature sensor 225 or the like disposed in the three-way catalyst 216. Alternatively, the temperature of the three-way catalyst 216 may be calculated (or estimated) from the temperature of the air flowing into the three-way catalyst 216.

Here, if the temperature Tc of the three-way catalyst 216 is less than the threshold value Tc1 (the step S102: YES), warm-up control for quickly improving the purification ability of the three-way catalyst 216 is started (step S103). In the warm-up control, the temperature of the exhaust gas passing through the three-way catalyst 216 is increased, for example, by the ECU 100 (not shown in FIG. 3) retarding or delaying ignition timing of the engine 200. This makes it possible to effectively purify the exhaust gas even at the start of cooling the engine 200, or the like.

If the warm-up control is started, the temperature of the three-way catalyst 216 is detected again, and it is determined whether or not the detected temperature Tc exceeds a threshold value Tc2 (step S104). The threshold value Tc2 is a value for determining whether or not the warm-up control is to be ended, and is set as a temperature (e.g. 450 degrees C.) high enough to desorb the sulfur adsorbed to the three-way catalyst 216 by the oxygen supply control described later. If the detected temperature Tc exceeds the threshold value Tc2 (the step S104: YES), the warm-up control is ended (step S105).

Figure 5:
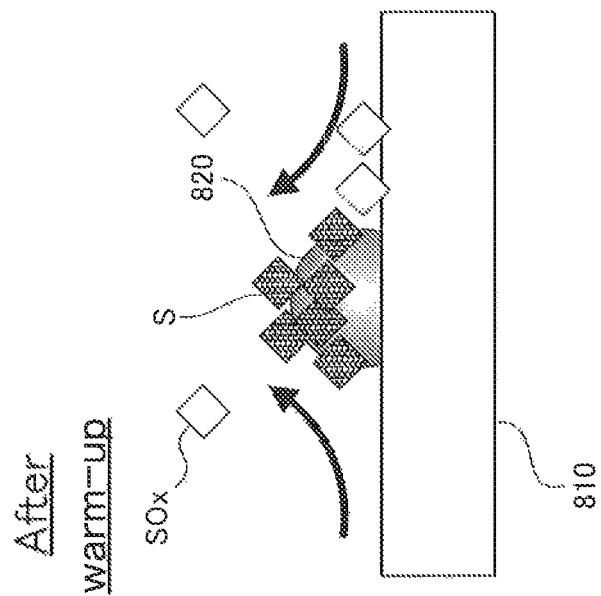
FIG. 5 is a conceptual diagram illustrating the state of a three-way catalyst before warm-up and after warm-up.
Figure 5:
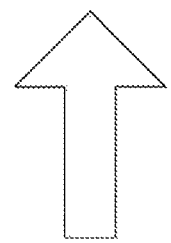
Figure 5:
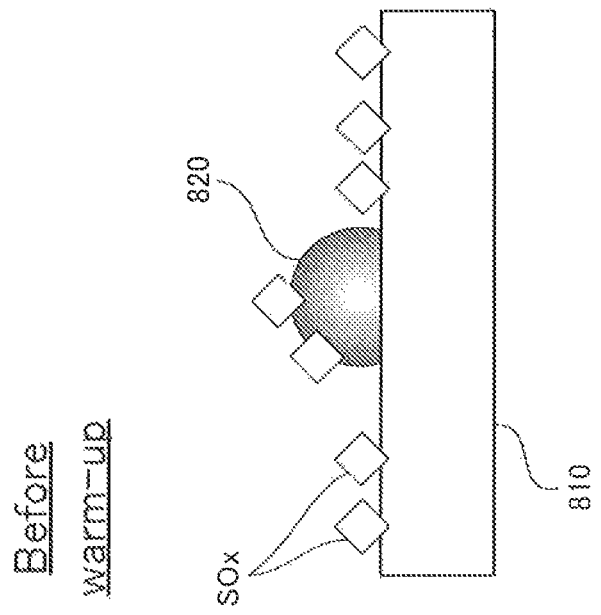

Now, the state of the three-way catalyst 216 before warm-up and after warm-up will be explained with reference to FIG. 5. FIG. 5 is a conceptual diagram illustrating the state of the three-way catalyst before warm-up and after warm-up. In FIG. 5, for convenience, the illustration of a substance(s) other than the sulfur component is omitted.

In FIG. 5, the three-way catalyst 216 has a carrier (or a catalyst coated material) 810 and a noble metal part 820. The sulfur contained as a component of the fuel of the engine 200 is released to the exhaust passage as SOx after fuel combustion and is adsorbed to the three-way catalyst 216.

The SOx adsorbed to the three-way catalyst. 216 is desorbed, for example, at about 450 degrees C. Thus, the SOx adsorbed before the warm-up control is desorbed by the warm-up control. According to the study of the present inventors, however the sulfur desorbed by the warm-up control is adsorbed to the noble metal part 820 of the three-way catalyst 216 under the rich atmosphere. The sulfur adsorbed to the noble metal part 820 of the three-way catalyst 216 as described above is not desorbed until the temperature reaches an extremely high temperature (e.g. 700 degrees C. or more) under the rich atmosphere Thus, if no measures are taken, the sulfur remains adsorbed to the three-way catalyst 216 even after the end of the warm-up control, and causes a reduction in the purification ability of the three-way catalyst 216.

The exhaust gas control apparatus for the internal combustion engine in the embodiment supplies oxygen to the three-way catalyst 216 after the warm-up control in order to desorb the sulfur which remains adsorbed to the three-way catalyst 216 even after the end of the warm-up control described above. The oxygen supply control will be detailed later.

Back in FIG. 4, if the warm-up control is ended, the temperature of the three-way catalyst 216 is detected again, and it is determined whether or not the detected temperature Tc is less than a threshold value Tc3 (step S106). The threshold value Tc3 is a value for determining whether or not it is in a state in which the oxygen supply control can be performed, and is set as a temperature (e.g. 800 degrees C.) at which the deterioration of the three-way catalyst 216 due to the oxygen supply control can be suppressed. This makes it possible to suppress the deterioration of the three-way catalyst 216 due to the oxygen supply control under the extremely high temperature.

If the detected temperature Tc is less than the threshold value Tc3 (the step S106: YES), it is determined whether or not an output value Oxs of the O2 sensor 218 disposed in the exhaust tube 215 exceeds a threshold value Oxs1 (step S107). The threshold value Oxs1 is a threshold value for determining whether or not the atmosphere of the three-way catalyst 216 is in an appropriate state for the oxygen supply control, and there is set a value corresponding to the rich atmosphere in which the sulfur can be effectively desorbed. If the output value Oxs of the O2 sensor 218 does not exceed the threshold value Oxs1 (the step S107: NO), rich correction (e.g. increasing the fuel) is performed so that the atmosphere of the three-way catalyst 216 becomes the rich atmosphere (step S108).

If the output value Oxs of the O2 sensor 218 exceeds the threshold value Oxs1 (the step S107: YES), it is determined whether or not the number of revolutions Ne of the engine 200 is less than a threshold value Ne1 (step S109). If the number of revolutions Ne of the engine 200 is less than the threshold value Ne1 (the step S109: YES), it is determined whether or not a load Ed of the engine 200 is less than a threshold value Ed1 (step S110).

If the number of revolutions Ne of the engine 200 is not less than the threshold value Ne1 (the step S109: NO), or if the load Ed of the engine 200 is not less than the threshold value Ed1 (the step S110: NO), the oxygen supply control is not started. In this manner, it is possible to prevent the deterioration of emission and drivability due to the implementation of the oxygen supply control in a state in which the number of revolutions Ne of the engine 200 and the load Ed are relatively high.

On the other hand, if the load Ed of the engine 200 is less than the threshold value Ed1 (the step S110: YES), the operation of the engine 200 is stopped, and the hybrid vehicle 1 becomes into a state of being driven by the power of motor generators MG1 and MG2 (a so-called EV mode) (step S111).

If the engine 200 becomes into an intermittent stop state, the oxygen supply control for desorbing the sulfur adsorbed to the three-way catalyst 216 is started (step S112).

Figure 6:
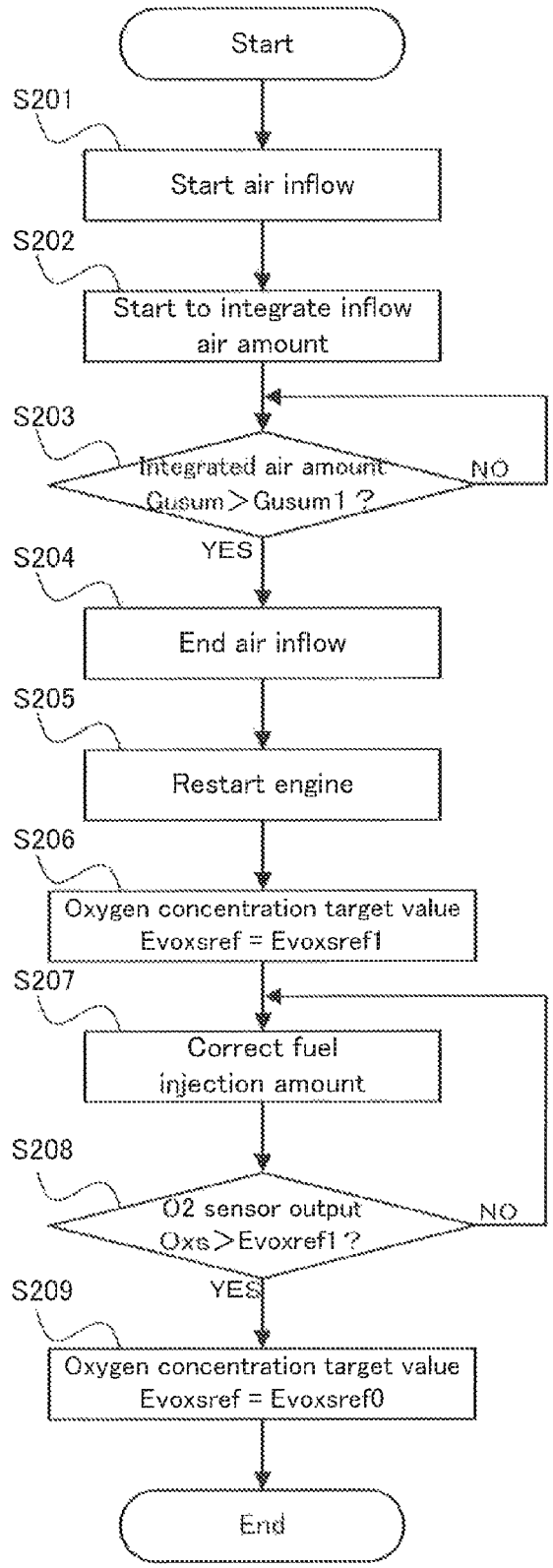
FIG. 6 is a flowchart illustrating the operation of the exhaust gas control apparatus for the internal combustion engine during implementation of the oxygen supply control.

Next, a process after the start of the oxygen supply control which is unique to the embodiment will be explained with reference to FIG. 6. FIG. 6 is a flowchart illustrating the operation of the exhaust gas control apparatus for the internal combustion engine during the implementation of the oxygen supply control.

In FIG. 6, during the oxygen supply control, firstly, the inflow of an air to the three-way catalyst 216 (i.e. the air containing much oxygen in comparison with the exhaust gas emitted after the combustion, etc.) is started (step S201). The inflow of the air to the three-way catalyst 216 is performed via the air supply tube 220 from the air pump 221. The inflow of the air may be performed by a method other than the air pump 221; for example, it may be realized by that the engine 200 which is stopped is subject to motoring by the power from the motor generator MG1, or may be realized by fuel cut before the engine 200 is completely stopped.

Figure 7:
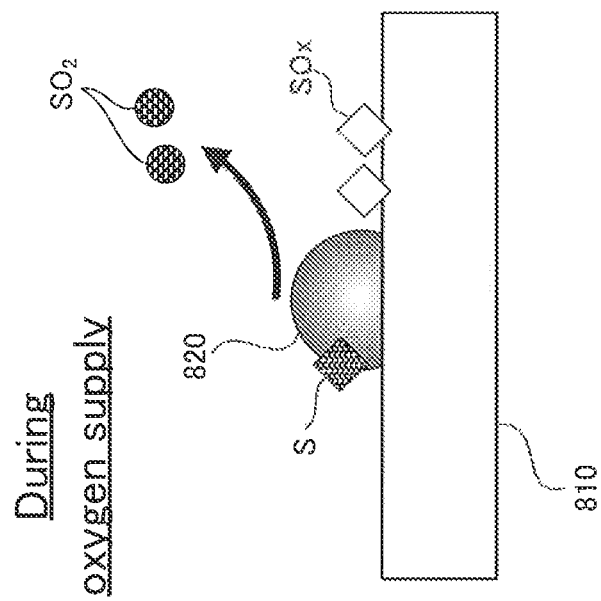
FIG. 7 is a conceptual diagram illustrating the state of the three-way catalyst before oxygen supply and during oxygen supply.
Figure 7:
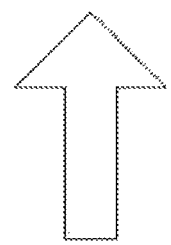
Figure 7:
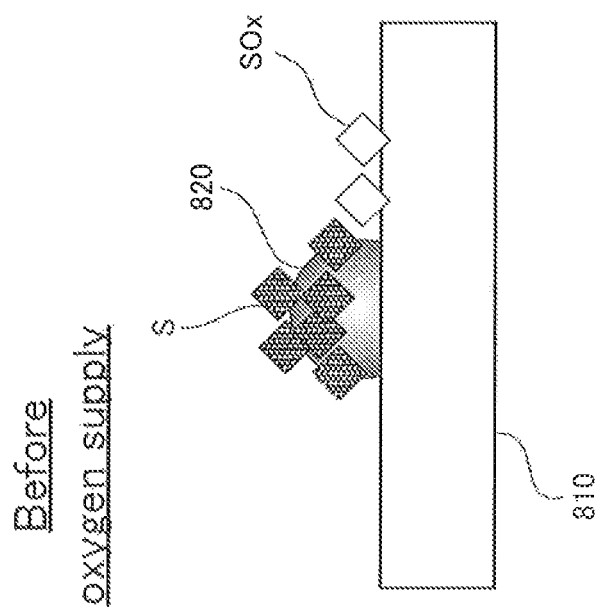

Now, the state of the three-way catalyst 216 before the oxygen supply control and during the oxygen supply control will be explained with reference to FIG. 7. FIG. 7 is a conceptual diagram illustrating the state of the three-way catalyst before oxygen supply and during oxygen supply. In FIG. 7, for convenience, the illustration of the substance(s) other than the sulfur component is omitted in the same manner as in FIG. 5.

In FIG. 7, in the three-way catalyst 216 before the oxygen supply control, the noble metal part 820 is coated by sulfur by the warm-up control. If a relatively high concentration of oxygen is supplied to the three-way catalyst 216 as described above, the sulfur adsorbed to the noble metal part 820 can be oxidized and desorbed as SO2 even though it is not at the high temperature (e.g. 700 degrees C. or more) high enough to desorb the sulfur under the rich atmosphere. It is thus possible to prevent that the purification ability of the three-way catalyst 216 after the end of the warm-up decreases due to the adsorbed sulfur.

Back in FIG. 6, if the inflow of the air is started, the integration of an inflow air amount is started (step S202). Then, if an integrated value Gusum of the inflow air amount exceeds a threshold value Gusum1 (step S203: YES), the inflow of the air is ended (step S204). The threshold value Gusum1 is a threshold value for determining whether or not a sufficient amount of oxygen is supplied to the three-way catalyst 216, and is set in advance, for example, on the basis of the sulfur desorption effect obtained by the oxygen supply or the like. The inflow air amount may be detected directly on the three-way catalyst 216, or may be derived indirectly from an air amount flowing into the underfloor catalyst 219 or the like.

Here, the inflow of the air is stopped according to the integrated value Susum of the inflow air amount, but the inflow of the air may be stopped according to, for example, the oxygen concentration of the O2 sensor 218 or the like. Specifically, if the output value Oxs of the O2 sensor 218 exceeds the predetermined threshold value, the inflow of the air may be stopped.

If the inflow of the air is sopped, the engine 200 is restarted (step S205). This changes the atmosphere of the three-way catalyst 216 from a lean state caused by the oxygen supply to a rich state.

Here, a target value Evoxstref of the oxygen concentration is set as the atmosphere of the three-way catalyst 216. The target value Evoxstref of the oxygen concentration is set to Evoxsref0 as an initial value. Particularly in the embodiment, the target value Evoxstref is changed to a correction value Evoxsref1 upon restart of the engine 200. The correction value Evoxsref1 is a value higher than the initial value Evoxsref0.

If the target value Evoxstref of the oxygen concentration is changed, the amount of the fuel injected from the injector 212 is increased in order to realize the correction value correction value Evoxsref1 (step S207). Then, if the output value Oxs of the O2 sensor exceeds the correction value Evoxsref1 (step S208: YES), the target value Evoxsref of the oxygen concentration is returned to the initial value Evoxsref0 (step S209), and a series of processing operations is ended.

As described above, by setting the atmosphere of the three-way catalyst. 216 to be rich upon restart of the engine 200, it is possible to prevent the increase in the amount of NOx emitted from the engine 200.

Figure 8:
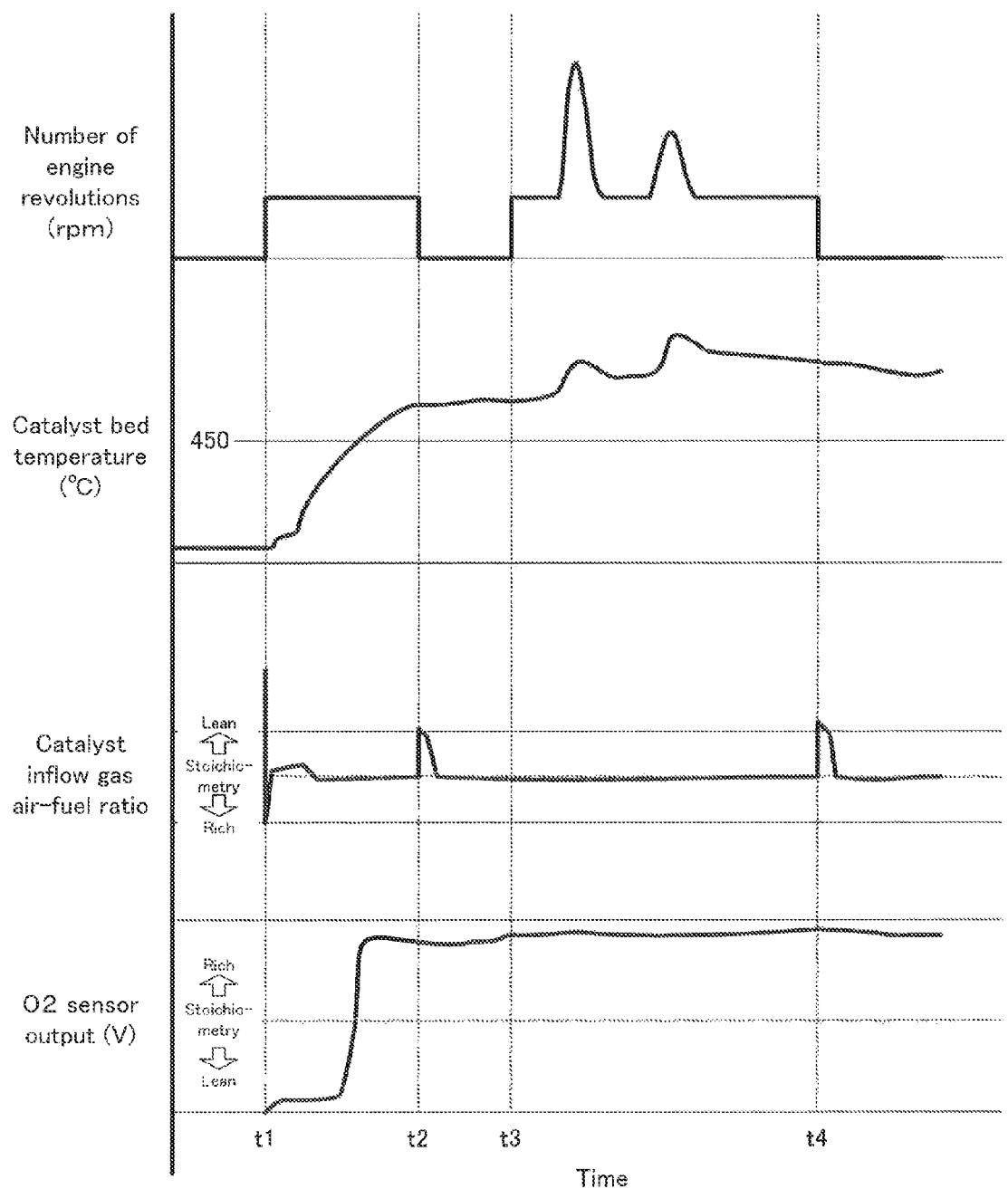
FIG. 8 is a chart illustrating changes in various parameters in operation of the exhaust gas control apparatus for the internal combustion engine in a comparative example.

Next, the state change of the engine 200 during the oxygen supply control described above will be explained more specifically with reference to FIG. 8 and FIG. 9. FIG. 8 is a chart illustrating changes in various parameters in operation of the exhaust gas control apparatus for the internal combustion engine in a comparative example. FIG. 9 is a chart illustrating changes in various parameters in operation of the exhaust gas control apparatus for the internal combustion engine in the embodiment.

As illustrated in FIG. 8, in the comparative example in which the oxygen supply control is not performed, the warm-up control of the three-way catalyst 216 is started at a time point t1 at which the engine 200 starts, and the bed temperature of the three-way catalyst 216 is quickly increased to a value which exceeds the activation temperature (450 degrees C.). On the other hand the air-fuel ratio of the gas flowing into the three-way catalyst 216 is controlled to be in a stoichiometric state, and the output value of the O2 sensor 218 is changed from the lean state to the rich state, and then, the rich state is maintained.

As illustrated in FIG. 9, in the embodiment in which the oxygen supply control is performed, the oxygen supply control (or fuel cut here) is performed at a time point t2 at which the warm-up control is ended. The supply of oxygen changes both the air-fuel ratio of the gas flowing into the three-way catalyst 216 and the output value of the O2 sensor 218, significantly to the lean side. Then, at a time point t3 at which the engine 200 is restarted, the air-fuel ratio of the gas flowing into the three-way catalyst 216 is controlled to be in the stoichiometric state, and the output value of the O2 sensor 218 is changed into the rich state.

As explained above, according to the exhaust gas control apparatus for the internal combustion engine in the embodiment, since the three-way catalyst 216 after the warm-up control is temporarily set to be in the lean atmosphere, the sulfur adsorbed to the three-way catalyst 216 during warm-up can be preferably desorbed. It is therefore possible to suppress the reduction in the purification ability of the three-way catalyst 216 due to the sulfur coating.

The present invention is not limited to the aforementioned embodiment, but various changes may be made, if desired, without departing from the essence or spirit of the invention which can be read from the claims and the entire specification. An exhaust gas control apparatus for an internal combustion engine, which involves such changes, is also intended to be within the technical scope of the present invention.

DESCRIPTION OF REFERENCE NUMERALS AND LETTERS 1 hybrid vehicle
10 hybrid drive apparatus
11 PCU
12 battery
13 accelerator opening sensor
14 vehicle speed sensor
100 ECU
110 number-of-engine-revolutions detection unit
120 crank angle detection unit
130 engine stop control determination unit
140 MG torque calculation unit
150 MG torque control unit
160 throttle control unit
200 engine
201 cylinder
203 piston
205 crankshaft
215 intake tube
208 throttle valve
209 throttle valve motor
210 intake port
212 injector
214 exhaust port
215 exhaust tube
216 three-way catalyst
917 air-fuel ratio sensor
218 O2 sensor
219 underfloor catalyst
220 secondary air supply tube
221 air pump
300 power distribution mechanism
500 drive shaft
600 speed reduction mechanism
810 carrier
820 noble metal part
MG1, MG2 motor generator

The invention claimed is:

1. An exhaust gas control apparatus for an internal combustion engine comprising an exhaust gas purification catalyst in an exhaust passage, said exhaust gas control apparatus comprising:
a fuel injector configured to supply fuel for warming the exhaust gas purification catalyst;
an oxygen supplying device configured to supply oxygen to the exhaust purification catalyst;
an air-fuel ratio sensor configured to detect an air-fuel ratio within the exhaust gas purification catalyst; and an electronic control unit in communication with the fuel injector, the oxygen supplying device, and the air-fuel ratio sensor, wherein the electronic control unit is configured to:

perform a warm-up operation to warm the exhaust gas purification catalyst by increasing the temperature of exhaust gases passing though the exhaust gas purification catalyst via the fuel injector;

detect an air-fuel ratio within the exhaust gas purification catalyst via the air-fuel ratio sensor;

stop, intermittently, the internal combustion engine based on the air-fuel ratio being detected as rich; and supply oxygen to the exhaust gas purification catalyst via the oxygen supplying device after completion of the warm-up operation and during the intermittent stop of the internal combustion engine.

2. The exhaust gas control apparatus for the internal combustion engine according to claim 1, wherein the electronic control unit is configured to set the air-fuel ratio within the exhaust gas purification catalyst to be in the rich atmosphere by increasing a fuel injection amount when the internal combustion engine is restarted after intermittent stop.

3. The exhaust gas control apparatus for the internal combustion engine according to claim 2, comprising an oxygen sensor configured to detect an oxygen amount supplied to the exhaust gas purification catalyst by said oxygen supplying device, wherein the electronic control unit is configured to correct an increment of the fuel injection amount on the basis of the detected oxygen amount.

* * * * *